(No Model.)

J. O'MEARA.
VALVE.

No. 316,168. Patented Apr. 21, 1885.

WITNESSES
F. L. Ourand
E. A. Finckel.

INVENTOR:
Jeremiah O'Meara,
by Wm. H. Finckel,
his Attorney.

N. PETERS, Photo-Lithographer, Washington, D. C.

UNITED STATES PATENT OFFICE.

JEREMIAH O'MEARA, OF NEW YORK, N. Y.

VALVE.

SPECIFICATION forming part of Letters Patent No. 316,168, dated April 21, 1885.

Application filed January 28, 1885. (No model.)

*To all whom it may concern:*

Be it known that I, JEREMIAH O'MEARA, a citizen of the United States, residing at New York, in the county of New York and State of New York, have invented certain new and useful Improvements in Valves, of which the following is a full, clear, and exact description.

This invention has for its object the swiveling of the valve to its stem, also the packing of the bonnet in such manner that the packing, when to be renewed, may be run out instead of having to be picked or dug out, and also the preventing of the loosening or running off of the gland or bonnet cap by the sticking thereto of the valve-stem as it is rotated. In prior patents (No. 213,239, dated March 11, 1879, Nos. 240,754 and 240,755, dated April 26, 1881, No. 258,592, dated May 30, 1882, and No. 266,639, dated October 31, 1882) I have set forth various means for accomplishing these several objects; and now this invention consists in certain other means to the same ends, as I will proceed to fully set forth and claim.

Figure 3:
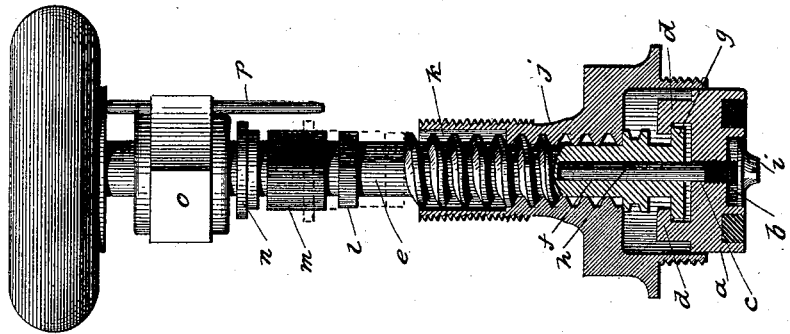
Figure 2:
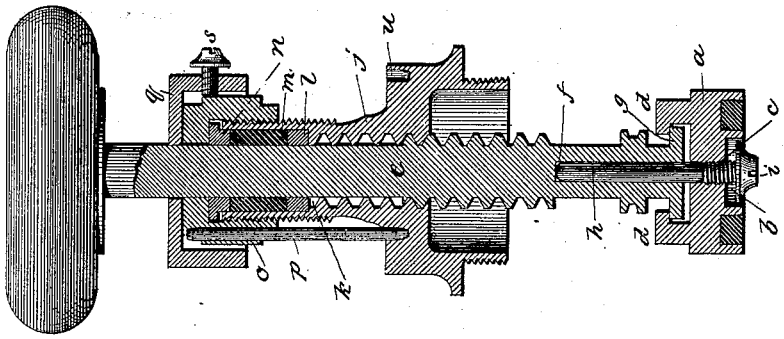
Figure 1:
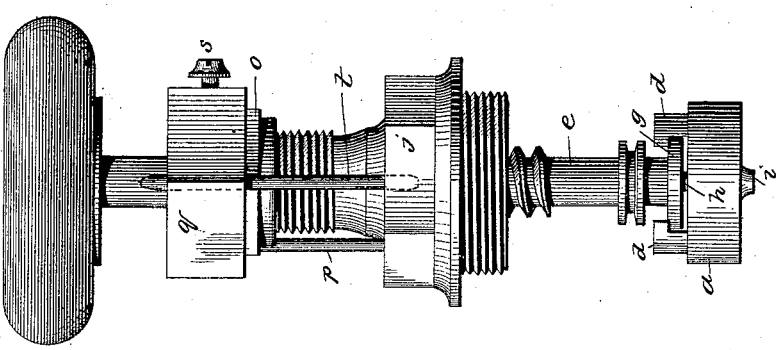
Figure 4:
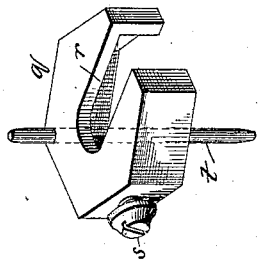

In the accompanying drawings, illustrating my invention, in the several figures of which like parts are similarly designated, Figure 1 is a side elevation of those portions of a valve to which my invention is applicable. Fig. 2 is a vertical section of the same. Fig. 3 is a partly sectional elevation of the same with the gland unscrewed and packing and washers moved out, the true position of the latter when the stem is in the position shown being indicated by dotted lines; and Fig. 4 is a perspective view of the locking-cap.

I have shown my improvements applied to a globe-valve, for convenience of illustration; but they are of general applicability.

The valve $a$, of any approved construction, has a recess, $b$, in its face, with a screw-threaded hole, $c$, and parallel undercut angular lugs $d$ on its back. The valve-stem $e$ has a longitudinal smooth-bored socket, $f$, in its lower end, and a lateral annular flange, $g$, which is engaged by the lugs $d$ of the valve, and when so engaged a pin, $h$, is dropped through the hole $c$ into the socket $f$ of the stem; but said pin is so much longer than the socket in the stem as to project into the hole $c$ of the valve, and hence prevent the valve from slipping laterally from the stem. The pin is secured in the socket by a screw, $i$, engaging the threaded hole $c$ in the valve without binding upon the pin, and the head of said screw fits in the recess $b$. The valve is thus free to rotate on the stem, and also to slightly rock on it, to accommodate itself to its seat. Instead of a separated screw and pin, I may make them in one piece, as in Fig. 3. It is obvious that the screw cannot work loose and so release the pin, inasmuch as said screw engages a thread in the valve, and turns with said valve. The valve is removable from its stem by taking out the screw and knocking out the pin, and then slipping it (the valve) from the flange on the stem.

The bonnet $j$ has a socket, $k$, in its screw-threaded neck, in the bottom of which is placed an annulus or washer, $l$, surrounding the valve-stem, and on this washer is placed the packing $m$, nearly filling the socket $k$. Another annulus or washer, $n$, is placed above the packing, and then the gland or screw-cap $o$, adapted to receive within it the washer $n$, is screwed down over the threaded neck of the bonnet, and the washer $n$ is thereby caused to act as a follower, to force the packing into the bonnet-socket and compress it about the stem within the said socket of the bonnet, and make a steam and water tight joint about the stem, to prevent leakage through the bonnet. When the packing is to be removed, the cap $o$ is run off and the stem run up, and its thread engaging the washer $l$ forces it and the superposed packing out of the neck of the bonnet, as indicated in dotted lines, Fig. 3, when said packing and washers may be separated, as shown in full lines, and the packing replaced with new in any usual manner. By this means I obviate the necessity of picking or digging out old and worn or imperfect packing, and also insure the tightness of the packing around the stem.

The cap $o$ may be provided with a pin, $p$, passed through a hole in its flange or fillet, and engaging one of a series of holes in the flange or fillet of the bonnet, (an old device,) to prevent said cap from being worked loose by the sticking of the valve-stem as it is turned to operate the valve; but instead of this, or as an auxiliary to it, I provide a cap, $q$, shaped to cover the cap $o$, and having an opening, $r$, to engage the valve-stem, and locked to the cap $o$ by a set-screw, $s$, passed through the side of the cap $q$ and bearing against the cap $o$, and engaged with the bonnet by a pin, $t$, passed through a hole in the said cap $q$, and dropped into one of a series of holes, $u$, in the fillet of the bonnet. The pins $p$ and $t$ are adjustable for removing the caps when desired.

What I claim is—

1. The combination, with the socketed and flanged stem, of the valve having angular lugs to engage said stem, a pin to engage the socketed stem and valve, and a screw to retain the pin in such engagement and to release it, substantially as described.

2. The combination, with the socketed and flanged stem, of the valve having angular lugs to engage said flanged stem, and provided with a screw-threaded hole, and the pin and screw therefor, substantially as described.

3. The combination of a socketed bonnet provided with a washer in the bottom of its socket, and superposed packing, a removable follower superposed upon the packing, a removable cap covering the socketed end of the bonnet, and a screw-threaded valve-stem movable longitudinally in said bonnet, to engage the lowermost washer therein and force it and its superposed packing out of the bonnet when the cap is removed, substantially as described.

4. The combination, with the bonnet $j$ and screw-cap or gland $o$, of a cap, $q$, fitting over said gland and secured thereto, and a pin, $t$, in said cap, engaging a hole or notch in the fillet or flange of the bonnet, to prevent the running off of the gland by the movement of the valve-stem, substantially as described.

In testimony whereof I have hereunto set my hand this 26th day of January, A. D. 1885.

JEREMIAH O'MEARA.

Witnesses:
  JOHN D. HOUSTON,
  HUGH J. DORAN.